(12) United States Patent
Munekata et al.

(10) Patent No.: US 6,947,646 B2
(45) Date of Patent: Sep. 20, 2005

(54) DEVICE AND METHOD FOR ALIGNMENT OF OPTICAL AXIS

(75) Inventors: Mutsuo Munekata, Chiba (JP); Toshiro Higuchi, Yokohama (JP)

(73) Assignees: Japan Science & Technology Agency, Kawaguchi (JP); Nano Control Co., Ltd., Tokyo (JP)

( * ) Notice: Subject to any disclaimer, the term of this patent is extended or adjusted under 35 U.S.C. 154(b) by 218 days.

(21) Appl. No.: 10/470,518

(22) PCT Filed: Feb. 1, 2002

(86) PCT No.: PCT/JP02/00805

§ 371 (c)(1),
(2), (4) Date: Jul. 29, 2003

(87) PCT Pub. No.: WO02/063357

PCT Pub. Date: Aug. 15, 2002

(65) Prior Publication Data

US 2004/0052469 A1 Mar. 18, 2004

(30) Foreign Application Priority Data

Feb. 2, 2001 (JP) ........................................ 2001-026644

(51) Int. Cl.⁷ ................................................. G02B 6/42
(52) U.S. Cl. ........................................... 385/52; 385/15
(58) Field of Search ............................... 385/52, 15, 31; 398/156

(56) References Cited

U.S. PATENT DOCUMENTS

| 4,452,506 A | * | 6/1984 | Reeve et al. .................. 385/52 |
| 4,688,882 A | * | 8/1987 | Failes .......................... 385/30 |
| 4,894,579 A |   | 1/1990 | Higuchi et al. |
| 5,109,450 A | * | 4/1992 | Johann et al. ................. 385/52 |
| 6,520,689 B2 | * | 2/2003 | DeMartino et al. ........... 385/98 |
| 6,748,131 B2 | * | 6/2004 | Steinberg et al. ............. 385/20 |
| 2004/0252947 A1 | * | 12/2004 | Liu et al. ...................... 385/52 |

FOREIGN PATENT DOCUMENTS

| JP | 5-324 U     | 1/1993  |
| JP | 5-127051 A  | 5/1993  |
| JP | 6-87206 B2  | 11/1994 |
| JP | 11-143541 A | 5/1999  |
| JP | 11-143542 A | 5/1999  |
| JP | 3010769 B2  | 12/1999 |
| JP | 3116481 B2  | 10/2000 |

* cited by examiner

Primary Examiner—Ellen E. Kim
(74) Attorney, Agent, or Firm—Frishauf, Holtz, Goodman & Chick, P.C.

(57) ABSTRACT

An optical axis alignment apparatus 10 has a chuck 13 for holding an optical member 14, a chuck 16 for holding an optical member 15, a pushing mechanism, which pushes the chuck 1 to generate a predetermined frictional force between the optical member 14 and the optical member 15, and actuators 18A to 18D. The actuators 18A to 18D have a piezoelectric element 51b which generates an impulsive inertial force by abrupt extension and contraction.

24 Claims, 4 Drawing Sheets

DEVICE AND METHOD FOR ALIGNMENT OF OPTICAL AXIS

This application is a U.S. National Phase Application under 35 USC 371 of International Application PCT/JP02/00805 filed Feb. 1, 2000.

TECHNICAL FIELD

The present invention relates to an optical axis alignment apparatus and an optical axis alignment method used for optical axis alignment between optical members, such as optical fibers and optical lenses.

BACKGROUND ART

In recent years, communication technologies utilizing optical fibers have been coming into wide use. In order to realize a long-haul signal transmission using an optical fiber, it is necessary to perform optical axis alignment between optical fiber parts and then couple the optical fiber parts by, e.g., welding, so that the coupling loss between the optical fiber parts is reduced.

Optical axis alignment of this kind between optical fiber parts is performed as follows. For example, in the case of optical axis alignment between two optical fiber parts, each of the fiber parts is fixed to the distal end of a stage, which is driven by a motor and has a multi-degree of freedom, so that the optical axis alignment between the two optical fiber parts is performed while moving the stages. More specifically, the two optical fiber parts are separated from each other with a predetermined small gap therebetween, and one or both of the stages are moved, while the light quantity passing through the two optical fiber parts is measured. The operation is performed to find a position where the light quantity passing through the two optical fiber parts is at the maximum. At this position, the two optical fiber parts are brought into face contact with each other and welded or so, so that they are fixed to each other.

In the optical axis alignment method described above, the optical axis alignment is performed while the optical fiber parts are separated from each other, and then the two optical fiber parts are brought into face contact with each other. Consequently, the optical fiber parts can cause a minute positional shift when they are moved, which makes it difficult to minimize the coupling loss between the optical fiber parts. For this reason, it may be preferable to perform optical axis alignment between optical fiber parts while the optical fiber parts are kept in face contact with each other. In conventional optical axis alignment apparatuses, however, when two optical fiber parts, which are kept in face contact with each other to have surface friction, are relatively moved with a predetermined force, a stick-slip phenomenon occurs at the contact surfaces and makes it difficult to delicately move the optical fiber parts in a stable state.

Furthermore, in conventional optical axis alignment apparatuses, where the contact surfaces of optical fiber parts tilt, the angle between the optical fiber parts have to be adjusted to make sure that the contact surfaces are brought into face contact with each other. In this case, it is necessary for a used tilting mechanism to make a delicate adjustment of the angels of the contact surfaces, and thus the tilting mechanism needs to have a complicated structure, thereby increasing the size of the optical axis alignment apparatus. In addition, the price of the optical axis alignment apparatus is also increased.

DISCLOSURE OF INVENTION

An object of the present invention is to provide an optical axis alignment apparatus and an optical axis alignment method, which can bring optical members into face contact with each other, using a simple mechanism, and can perform optical axis alignment while the optical members are in face contact with each other. Another object of the present invention is to provide an inexpensive optical axis alignment apparatus. Still another object of the present invention is to provide an optical axis alignment apparatus, which allows optical members to be easily coupled by welding or the like.

According to a first aspect of the present invention, there is provided an optical axis alignment apparatus using an impulsive inertial force generated by abrupt extension and contraction of a piezoelectric element, the apparatus comprising:

first holding means for holding a first optical member;

second holding means for holding a second optical member disposed in contact with the first optical member;

a pressing mechanism for pressing the first holding means to generate a predetermined frictional force between the first optical member and the second optical member; and an actuator, which has a piezoelectric element and uses an impulsive inertial force generated by abrupt extension and contraction of the piezoelectric element to strike a strike target, which is at least one of the first optical member, the second optical member, the first holding means, and the second holding means, so as to align optical axes of the first optical member and the second optical member with each other.

According to a second aspect of the present invention, there is provided an optical axis alignment apparatus using an impulsive inertial force generated by abrupt extension and contraction of a piezoelectric element, the apparatus comprising:

first holding means for holding a first optical member;

a stage, on which the first holding means is placed;

second holding means for holding a second optical member disposed in contact with the first optical member;

a pressing mechanism for pressing the second holding means to generate a predetermined frictional force between the first optical member and the second optical member;

an tilting mechanism disposed between the second holding means and the pushing mechanism, or between the first holding means and the stage, and holding the first optical member and the second optical member in face contact with each other; and an actuator, which has a piezoelectric element and uses an impulsive inertial force generated by abrupt extension and contraction of the piezoelectric element to strike a strike target, which is at least one of the first optical member, the second optical member, the first holding means, and the second holding means, so as to align optical axes of the first optical member and the second optical member with each other.

According to a third aspect of the present invention, there is provided an optical axis alignment method of performing optical axis alignment between a plurality of optical members, the method comprising:

a first step of using an tilting mechanism to bring a plurality of optical members into face contact with each other, and applying a predetermined pressing force to the tilting mechanism to hold the plurality of optical members by friction; and a second step of striking at least one of the plurality of optical members, using an impulsive inertial force generated by abrupt extension and contraction of a piezoelectric element, to move the position of the struck optical member while keeping a state where the plurality of optical members are frictionally held, so as to increase light quantity passing through optical axes of the plurality of optical members, while measuring the light quantity passing through the optical axes of the plurality of optical members.

According to the present invention, optical axis alignment between optical members is performed, while the optical members are in face contact with each other. As a result, it is possible to perform the optical axis alignment in a shorter time with a higher accuracy, as compared to conventional cases where optical axis alignment is performed while optical members are separated from each other with a small gap therebetween, and then they are brought into face contact with each other. In addition, since the optical members are brought into face contact with each other, using a simple mechanism, the structure of the apparatus can easily become simple and compact. Furthermore, after the optical axis alignment is completed, the optical members are frictionally held to each other, and in this state, the optical members can be easily coupled by welding or the like.

BEST MODE FOR CARRYING OUT THE INVENTION

Figure 1:
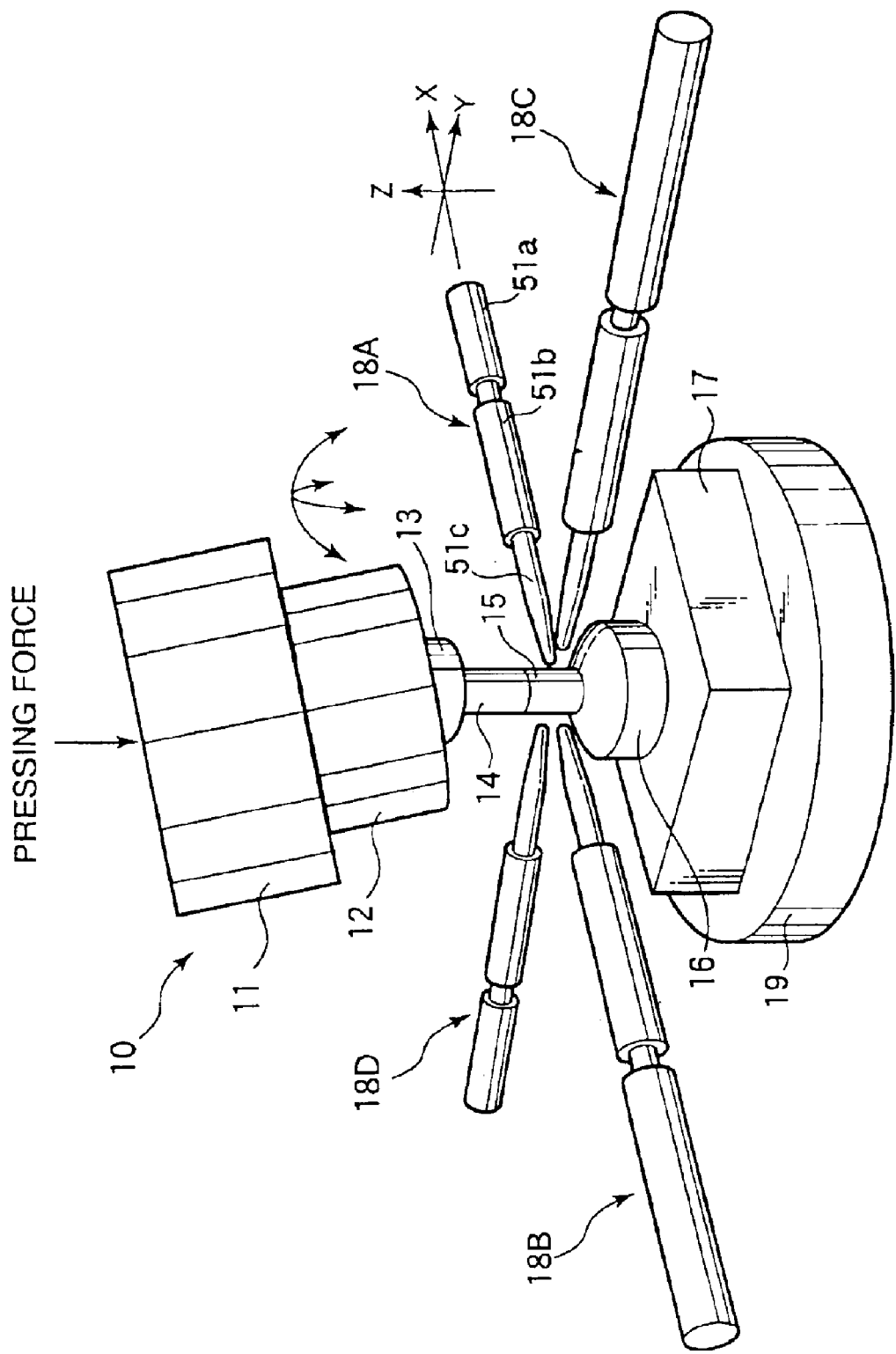
FIG. 1 is a perspective view showing an optical axis alignment apparatus according to a first embodiment of the present invention.

FIG. 1 is a perspective view schematically showing the structure of an optical axis alignment apparatus 10 according to a first embodiment of the present invention. The optical axis alignment apparatus 10 includes a chuck 13 for holding an optical member 14; a chuck 16 for holding an optical member 15; a universal joint 12, which holds the chuck 13; a joint holding member 11, which holds the universal joint 12; a stage 17, on which the chuck 16 is placed; a rotary stage 19, to which the stage 17 is fixed; two actuators 18A and 18B disposed to sandwich the optical member 15 in an X direction; and two actuators 18C and 18D disposed to sandwich the optical member 15 in a Y direction. Each of the actuators 18A to 18D is formed of a head (tip member) 51c, a piezoelectric element 51b, and an air cylinder 51a. The actuators 18A to 18D are held by holding members, which are not shown.

The joint holding member 11 is pressed by a pressing mechanism (not shown), such as a spring or an air cylinder, so that it applies a predetermined pressure to members therebelow. The universal joint 12 is one of forms of a tilting mechanism, and can change the hold angle of the chuck 13. The chuck 13 holds the optical member 14, and the chuck 16 holds the optical member 15. The chuck 13 holds the optical member 14 at a constant angle, and the chuck 16 holds the optical member 15 also at a constant angle. The joint holding member 11 is pushed, whereby the optical members 14 and 15 are frictionally held relative to each other. The chuck 16 is frictionally held relative to the stage 17.

Optical fiber cables (not shown) are connected to the optical members 14 and 15. The optical fiber cables are connected to a light quantity measuring instrument, which has a light emitting portion and a light receiving portion, so that the light quantity passing through the optical members 14 and 15 can be measured. Where the optical axes of the optical members 14 and 15 are not aligned with each other, the light quantity passing through the optical members 14 and 15 is small. Optical axis alignment between the optical members 14 and 15 is performed to increase the passing light quantity.

The head 51c forming part of the actuators 18A to 18D is made of a metal material, such as a super hard or stainless steel, so that it can reliably applies an impulsive inertial force (which will be referred to as "impact force", hereinafter) generated by the piezoelectric element 51b to the optical member 15, and can increase the level of the impact force generated by the piezoelectric element 51b.

A laminated piezoelectric element is preferably used as the piezoelectric element 51b, whose extendable direction agrees with the longitudinal direction of the actuators 18A to 18D (i.e., the X direction for the actuators 18A and 18B, and the Y direction for the actuators 18C and 18D).

The air cylinder 51a pushes the piezoelectric element 51b and the head 51c toward the optical member 15 with a predetermined pressure, so that the head 51c comes into contact with the optical member 15. This pressure and the friction holding force for the optical member 15 are adjusted to prevent the optical member 15 from being moved by this pressure.

In the optical axis alignment apparatus 10 having the arrangement described above, optical axis alignment between the optical members 14 and 15 is performed, as follows. Specifically, the optical member 15 is held by the chuck 16, which is then placed at a predetermined position on the stage 17. On the other hand, the optical member 14 is held by the chuck 13, which is then attached to the universal joint 12. Subsequently, a pressure is applied to the joint holding member 11 to push the optical member 14 against the optical member 15, so that the optical member 14 and the optical member 15 are brought into face contact with each other.

Where the end face of the optical member 14 tilts relative to the end face of the optical member 15, the universal joint 12 tilts to cause the end face of the optical member 14 to be parallel to the end face of the optical member 15 by means of thrust of pushing the optical member 14 against the optical member 15, after part of the optical member 14 comes into contact with the end face of the optical member 15. As a result, the optical members 14 and 15 can be brought into face contact with each other. In this state, however, the optical axes of the optical members 14 and 15 do not agree with each other, in the majority of cases.

Then, the actuators 18A to 18D are disposed to strike (knock) the optical member 15. One of the four, in total, actuators 18A to 18D is operated to strike the optical member 15, so that the optical member 15 is positionally shifted along with the chuck 16, while the optical members 14 and 15 are in face contact with each other and frictionally held, and the light quantity passing through the optical members 14 and 15 is measured.

For example, when the actuator 18C is used, its air cylinder 51a is first operated to push the head 51c against the optical member 15. In this state, the piezoelectric element 51b is supplied with a voltage pulse, such as a rectangular pulse (trapezoidal pulse) voltage, which has a quick rise in voltage, so that the piezoelectric element 51b causes an abrupt change in the length. At this time, an impact force is generated by the piezoelectric element 51b and instantaneously strikes the optical member 15.

By instantaneously striking the optical member 15, it is possible to gradually slide the optical member 15, while the optical members 14 and 15 are in face contact with each other and frictionally held. In contrast, if a static pushing pressure is applied to the optical member 15, which is in face contact with the optical member 14 and frictionally held, by gradually moving the air cylinder 51a or the piezoelectric element 51b, the optical member 15 is abruptly and greatly slid when the pushing pressure exceeds the friction holding force. In this case, it is difficult to perform optical axis alignment between the optical members 14 and 15.

Provided that the optical member 15 is struck by the actuator 18C, and the light quantity passing through the optical members 14 and 15 temporarily increases and then decreases. In this case, the actuator for strike is switched to the actuator 18D to return the optical member 15 to a position where the light quantity passing through the optical members 14 and 15 is at the maximum. On the other hand, provided that the optical member 15 is struck by the actuator 18C, and the light quantity passing through the optical members 14 and 15 gradually decreases. In this case, the actuator for strike is switched to the actuator 18D, and an operation is performed to search for a position where the light quantity passing through the optical members 14 and 15 is at the maximum. At this time, when the passing light quantity decreases due to passing over the position, the actuator 18C is used again to return the optical member 15 to the position where the light quantity passing through the optical members 14 and 15 is at the maximum.

After the optical axis alignment in the Y direction is finished, optical axis alignment in the X direction is performed, using the actuators 18A and 18B, by the same method as in the optical axis alignment using the actuators 18C and 18D. As a result, the entire optical axis alignment is completed. Although the optical member 15 is struck in the method described above, the chuck 16 may be struck, because the chuck 16 slides along with the optical member 15.

After the optical axis alignment of the optical members 14 and 15 is completed, the actuators 18A to 18D are caused to retreat. Then, a welding device, such as a YAG laser welding device, for welding the optical members 14 and 15 is set on the optical axis alignment apparatus 10, and used to weld at least parts of the contact surfaces of the optical members 14 and 15, so as to prevent the optical members 14 and 15 from causing the positional shift. Then, the contact surfaces of the optical members 14 and 15 are entirely welded, while the rotary stage 19 is rotated. As a result, the optical members 14 and 15 are coupled in a state where their optical axes are aligned, so that the coupling loss is minimized. The operation for entirely welding the optical members 14 and 15 may be performed, while the optical member 14 is released from the holding of the chuck 13.

Figure 2:
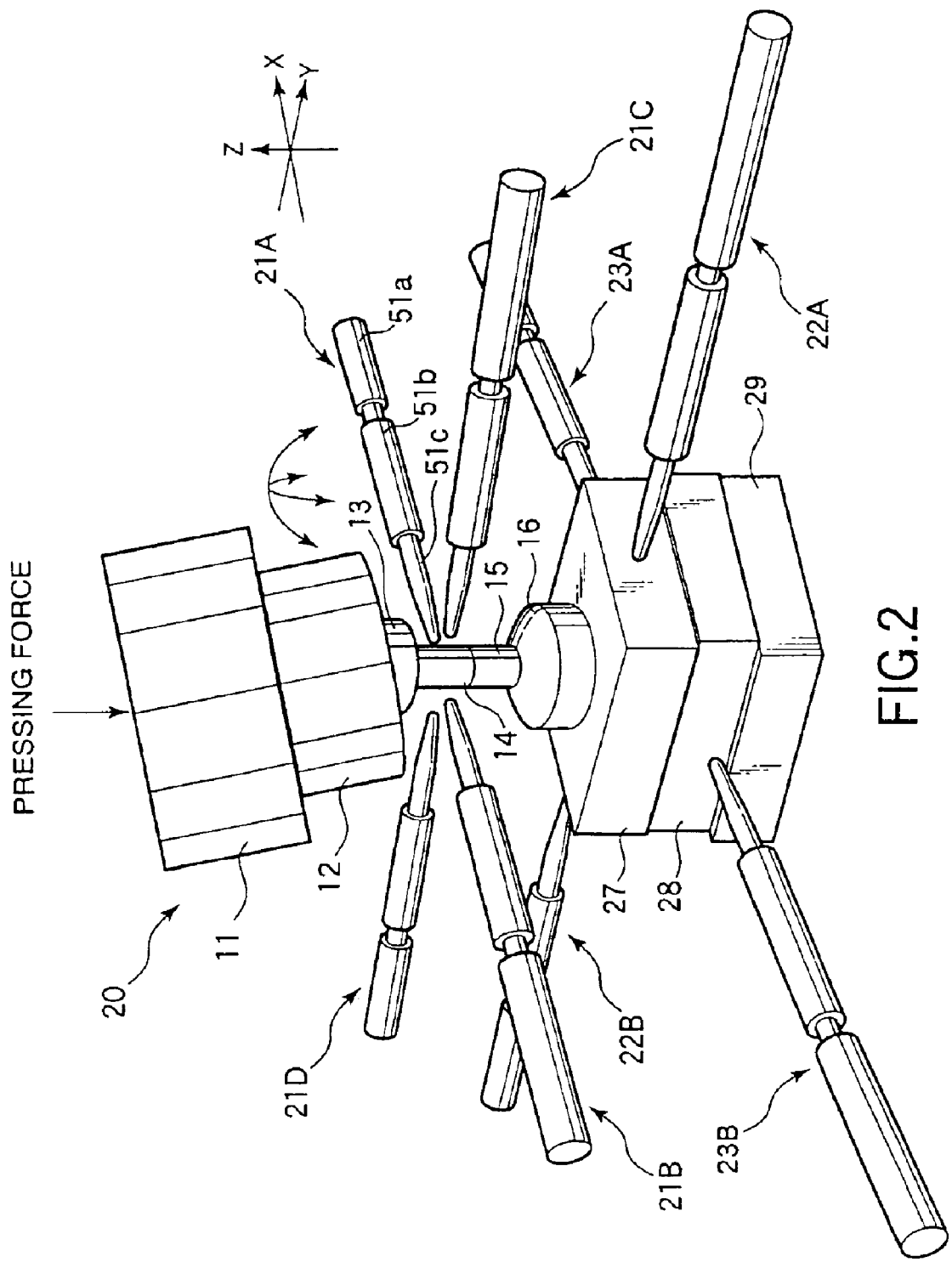
FIG. 2 is a perspective view showing an optical axis alignment apparatus according to a second embodiment of the present invention.

An explanation will be given of a second embodiment of the present invention. FIG. 2 is a perspective view schematically showing the structure of an optical axis alignment apparatus 20 according to the second embodiment of the present invention. The optical axis alignment apparatus 20 includes a chuck 13 for holding an optical member 14; a chuck 16 for holding an optical member 15; a universal joint 12, which holds the chuck 13; a joint holding member 11, which holds the universal joint 12; a slide stage 27 slidable in a Y direction, to which the chuck 16 is fixed; a slide stage 28 slidable in an X direction, which holds the slide stage 27; and a stationary stage 29, which holds the slide stage 28.

Two actuators 21A and 21B are disposed to sandwich the optical member 14 in the X direction. Two actuators 21C and 21D are disposed to sandwich the optical member 14 in the Y direction. Actuators 22A and 22B are disposed to slide the slide stage 27 in the Y direction. Actuators 23A and 23B are disposed to slide the slide stage 28 in the X direction.

The actuators 21A to 21D, 22A, 22B, 23A, and 23B have a structure equivalent to the actuators 18A to 18D used in the optical axis alignment apparatus 10. Namely, each of them is formed of a head 51c, a piezoelectric element 51b, and an air cylinder 51a.

The joint holding member 11 is pressed by a pressing mechanism (not shown), such as a spring or an air cylinder, so that it applies a predetermined pressure to members therebelow. The actuators 21A to 21D, 22A, 22B, 23A, and 23B are held by holding members (not shown).

The optical axis alignment apparatus 20 differs from the optical axis alignment apparatus 10 described above, in that, firstly, the tilt state of the universal joint 12 against the optical member 14 is changed by striking the optical member 14, so as to adjust the attitude of the optical member 14.

In the optical axis alignment apparatus 10, the universal joint 12 is caused to act only by thrust, which is generated between the optical members 14 and 15 by pushing the joint holding member 11, so that the optical members 14 and 15 are brought into face contact with each other. For this reason, due to surface roughness of the contact surfaces of the optical members 14 and 15, or the like, there may be a case where they cannot be preferably brought into face contact with each other.

On the other hand, in the optical axis alignment apparatus 20, the universal joint 12 has a moderate stiffness, so that the universal joint 12 can be held in tilt state against the optical member 14, so long as the chuck 13 is not supplied with a force larger than a predetermined value. When the optical member 14 is struck, an impact force applied to the optical member 14 changes the tilt state of the universal joint 12 against the optical member 14, thereby adjusting the attitude of the optical member 14. As a result, the optical axis alignment apparatus 20 allows the end faces of the optical members 14 and 15 to reliably come into face contact with each other, so that accurate optical axis alignment can be performed.

Secondly, in the optical axis alignment apparatus 20, the chuck 16 is fixed to the slide stage 27 and thus cannot slide on the slide stage 27, but the slide stage 27 can be moved only in the Y direction. In addition, the slide stage 28 can be slid in X direction, so that the chuck 16 and the slide stage 27 are slid together only in the X direction.

In order to realize the motion described above, a Y direction linear guide (not shown) is disposed between the slide stage 27 and the slide stage 28, and an X direction linear guide (not shown) is disposed between the slide stage 28 and the stationary stage 29. As in the optical axis alignment apparatus 10, a rotary stage may be preferable disposed below the stationary stage 29 to rotate the optical members 14 and 15.

In the optical axis alignment apparatus 20, the actuators 21A to 21D are used to strike the optical member 14 and change the tilt state of the universal joint 12 against the optical member 14, so as to adjust the attitude of the optical member 14. By doing so, the optical members 14 and 15 are brought into face contact with each other. In place of the optical member 14 being struck, the chuck 13 may be struck, so that the optical members 14 and 15 are brought into face contact with each other. Since the joint holding member 11 is always supplied with a pushing pressure, the attitude of the optical member 14 is adjusted, while the optical member 14 is in contact with the optical member 15.

After finishing the adjustment to the attitude of the optical member 14, the actuators 22A and 22B are used to strike the slide stage 27, so as to move the optical member 15 only in the Y direction, or the actuators 23A and 23B are used to strike the slide stage 28, so as to move the optical member 15 only in the X direction. By doing so, optical axis alignment between the optical members 14 and 15 is performed.

In the optical axis alignment apparatus 10, either one of the actuators 18A to 18D is used to strike the optical member 15, so as to slide the optical member 15. In this case, when the actuators 18A and 18B are driven, the optical member 15 slides not necessarily only in the X direction, but may shift in the Y direction while it mainly moves in the X direction. Similarly, when the actuators 18C and 18D are driven, the optical member 15 slides not necessarily only in the Y direction, but may shift in the X direction while it mainly moves in the Y direction. In contrast, according to the optical axis alignment apparatus 20, optical member 15 is moved reliably only in the X direction or only in the Y direction, thereby improving positioning accuracy.

The optical member 15 is moved to perform optical axis alignment by any of the following method. Specifically, in one method, while the light quantity passing through the optical members 14 and 15 is measured, the slide stage 27 is slid in the Y direction to determine the best position in the Y direction, and then the slide stage 28 is slid in the X direction to determine the best position in the X direction. In another method, the order of the positioning directions is reverse to that described above. In still another method, while the light quantity passing through the optical members 14 and 15 is measured, the actuators 22A, 22B, 23A, and 23B is selectively and suitably driven to cause the light quantity to be close to the maximum passing light quantity of the optical members 14 and 15 measured in advance.

After the optical axis alignment of the optical members 14 and 15 is completed, the actuators 21A to 21D, 22A, 22B, 23A, and 23B are caused to retreat. Then, the optical members 14 and 15 are coupled by, e.g., a YAG laser welding device. Where the stationary stage 29 is held on a rotary stage, the optical members 14 and 15 can be coupled by a method as described in the optical axis alignment apparatus 10. According to the optical axis alignment apparatus 20, optical axis alignment and coupling of the optical members 14 and 15 can be performed more accurately, as compared with the optical axis alignment apparatus 10.

Figure 3:
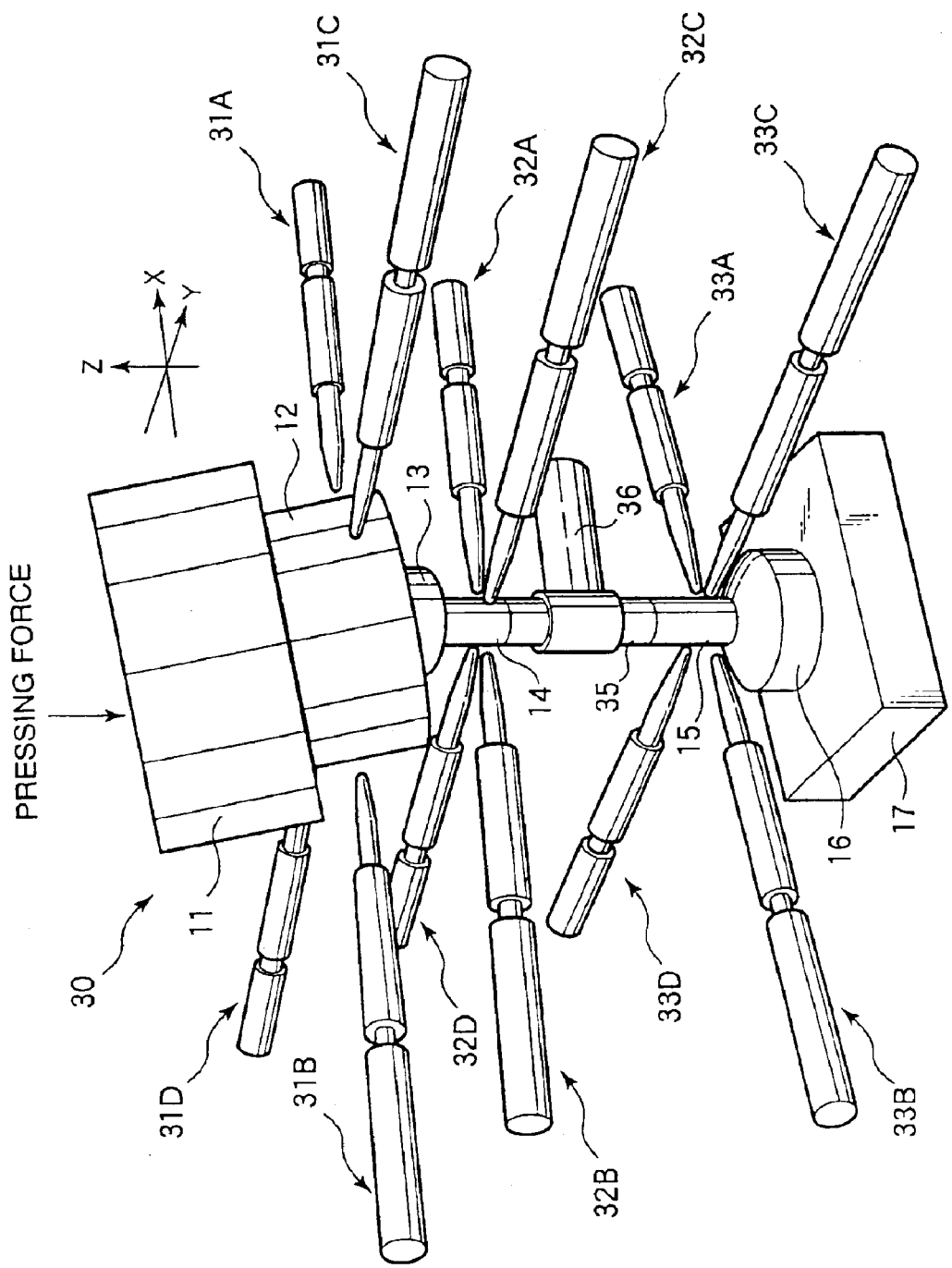
FIG. 3 is a perspective view showing an optical axis alignment apparatus according to a third embodiment of the present invention.

An explanation will be given of a third embodiment of the present invention. FIG. 3 is a perspective view schematically showing the structure of an optical axis alignment apparatus 30 according to the third embodiment of the present invention. The optical axis alignment apparatus 30 includes a chuck 13 for holding an optical member 14; a chuck 16 for holding an optical member 15; a chuck 36 for holding an optical member 35; a universal joint 12, which holds the chuck 13; a joint holding member 11, which holds the universal joint 12; a stage 17, on which the chuck 16 is placed; four actuators 31A to 31D disposed to sandwich the universal joint 12 in an X direction and a Y direction; four actuators 32A to 32D disposed to sandwich the optical member 14 in the X direction and the Y direction; and four actuators 33A to 33D disposed to sandwich the optical member 15 in the X direction and the Y direction. The actuators 31A to 31D, 32A to 32D, and 33A to 33D have a structure equivalent to the actuators 18A to 18D described previously.

The joint holding member 11 is pressed by a pressing mechanism (not shown), such as a spring or an air cylinder, so that it applies a predetermined pressure to members therebelow. The actuators 31A to 31D, 32A to 32D, and 33A to 33D are held by holding members (not shown).

The optical axis alignment apparatus 30 has a structure, in which the optical member 35 is disposed between the optical members 14 and 15, which are explained with reference to the optical axis alignment apparatus 10, and the optical member 35 is fixed to the chuck 36. In addition, the actuators 32A to 32D are disposed for the optical member 14, and the actuators 31A to 31D are disposed for the universal joint 12.

In the optical axis alignment apparatus 10, the universal joint 12 is fixed to the joint holding member 11. In this respect, in the optical axis alignment apparatus 30, the universal joint 12 is frictionally held, using a friction holding force generated by a pushing pressure applied to the joint holding member 11. With this arrangement of the optical axis alignment apparatus 30, the universal joint 12 can be moved by the actuators 31A to 31D, while the joint holding member 11 is stationary. The universal joint 12 has a moderate stiffness, so that the universal joint 12 can be held in tilt state against the optical member 14, so long as the chuck 13 is not supplied with a force larger than a predetermined value.

The optical member 35 is held stationary by the chuck 36 to prevent its positional shift, after the joint holding member 11 is supplied with a pushing pressure, and friction holding forces act between the optical members 14 and 35, and the optical members 35 and 15. The actuators 32A to 32D are used to strike the optical member 14, so as to change the tilt state of the universal joint 12 against the optical member 14. By doing so, the attitude of the optical member 14 is adjusted, and the optical member 14 is brought into face contact with the optical member 35.

Optical axis alignment of the optical member 15 relative to the optical member 35 is performed, using the actuators 33A to 33D. Since the optical member 35 is fixed, the optical axis alignment between the optical members 35 and 15 is performed, while driving the actuators 33A to 33D to slide the optical member 15 along with the chuck 16 on the stage 17.

In the optical axis alignment apparatus 30, optical axis alignment among the optical members 14, 15, and 35 is performed, by the following three operations conducted in cooperation, while the light quantity passing through the optical members 14, 15, and 35 is measured. (1) The actuators 31A to 31D are used to move the universal joint 12 along the bottom surface of the joint holding member 11, so as to move the optical member 14 in the X direction and the Y direction. (2) The actuators 32A to 32D are used to strike the optical member 14, so as to change the tilt state of the universal joint 12 against the optical member 14, and thus adjust the attitude of the optical member 14. (3) The actuators 33A to 33D are used to strike the optical member 15 or the chuck 16, so as to slide the optical member 15 and the chuck 16 in the X-Y plane.

Figure 4:
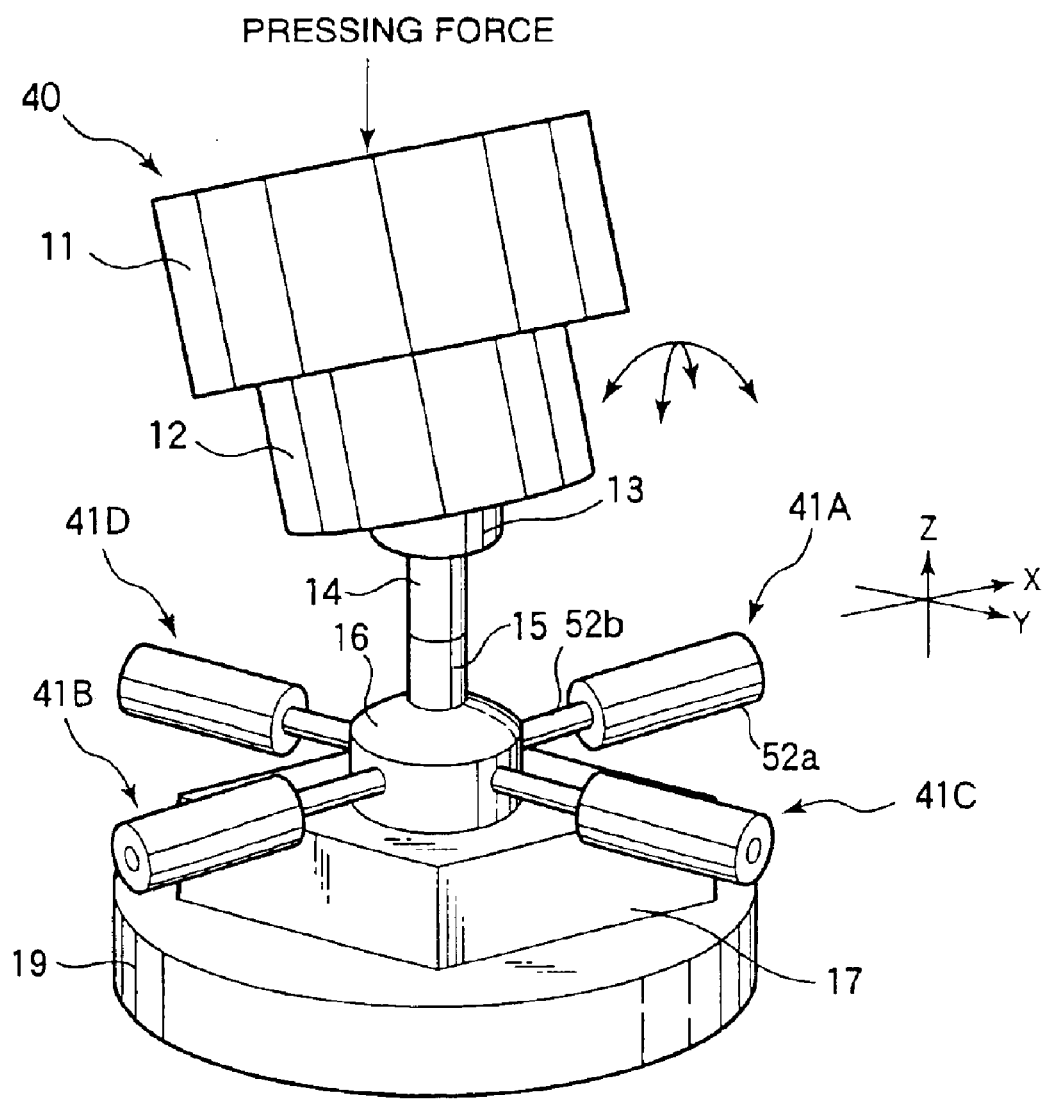
FIG. 4 is a perspective view showing an optical axis alignment apparatus according to a fourth embodiment of the present invention.

An explanation will be given of a fourth embodiment of the present invention. FIG. 4 is a perspective view schematically showing the structure of an optical axis alignment apparatus 40 according to the fourth embodiment of the present invention. The optical axis alignment apparatus 40 includes a chuck 13 for holding an optical member 14; a chuck 16 for holding an optical member 15; a universal joint 12, which holds the chuck 13; a joint holding member 11, which holds the universal joint 12; a stage 17, on which the chuck 16 is placed; a rotary stage 19, to which the stage 17 is fixed; two actuators 41A and 41B disposed to sandwich the chuck 16 in an X direction; and two actuators 41C and 41D disposed to sandwich the chuck 16 in a Y direction.

Each of the actuators 41A to 41D has a piezoelectric element 52b and a weight 52a. One end of the piezoelectric element 52b in its extendable direction is fixed to the chuck 16, and the weight 52a is fixed to the other end. As in the optical axis alignment apparatus 10, the joint holding member 11 is pressed by a pressing mechanism (not shown), such as a spring or an air cylinder, so that it applies a predetermined pressure to members therebelow. Since the joint holding member 11 is pushed, the optical members 14 and 15 are frictionally held, and the chuck 16 is frictionally held on the stage 17.

In the optical axis alignment apparatus 40, the chuck 16 is moved on the following principle, which will be explained where the actuator 41A is used, for example. At first, the actuator 41A is driven to move the chuck 16 in a direction toward the actuator 41B from the actuator 41A (which will be referred to as "−X direction", hereinafter). The movement of the chuck 16 in the −X direction is performed, such that the piezoelectric element 52b is supplied with a voltage having a quick rise, by which the piezoelectric element 52b extends abruptly. Consequently, an impulsive inertial force in the −X direction is applied to the chuck 16 by the agency of the inertial force of the weight 52a.

Then, the voltage supplied to the piezoelectric element 52b is caused to fall, so that the piezoelectric element 52b contracts back to the original length. At this time, due to the contraction of the piezoelectric element 52b, the chuck 16 is supplied with an inertial force in a direction toward the actuator 41A from the actuator 41B (which will be referred to as "+X direction", hereinafter). The degree of the inertial force in the +X direction acting on the chuck 16 depends on the contraction rate of the piezoelectric element 52b. As the falling rate of the voltage supplied to the piezoelectric element 52b is smaller, and thus the piezoelectric element 52b contracts more slowly, the inertial force in the +X direction acting on the chuck 16 has a smaller degree.

Accordingly, when the extended piezoelectric element 52b is changed back to the original length, the piezoelectric element 52b can be restored to the original state without moving the chuck 16 in the +X direction by either of the following methods. Specifically, the frictional force acting between the chuck 16 and the stage 17 is set such that the frictional force between the chuck 16 and the stage 17 is larger than the inertial force in the +X direction acting on the chuck 16; or the falling rate of the voltage supplied to the piezoelectric element 52b is reduced.

In other words, when the piezoelectric element 52b is supplied with a voltage pulse, which has a quick rise and a slow fall, the chuck 16 can be moved in the −X direction. Where such voltage pulses are applied to the piezoelectric element 52b in series, the chuck 16 can be continuously moved in the −X direction.

In the case where the actuator 41A is used to move the chuck 16 in the +X direction, at first, the piezoelectric element 52b is supplied with a voltage having a slow rise, so that the piezoelectric element 52b extends slowly. At this time, a force in the −X direction is applied to the chuck 16 by the agency of the inertial force of the weight 52a. Accordingly, the frictional force acting between the chuck 16 and the stage 17 is set such that the frictional force between the chuck 16 and the stage 17 is larger than the force in the −X direction acting on the chuck 16.

Conversely, where a predetermined frictional force is generated between the chuck 16 and the stage 17, the rising rate of the voltage supplied to the piezoelectric element 52b is adjusted such that the frictional force is larger than the force in the −X direction acting on the chuck 16. By doing so, the piezoelectric element 52b can be extended without moving the chuck 16 in the −X direction.

Then, the voltage supplied to the piezoelectric element 52b is caused to fall quickly, so that the piezoelectric element 52b contracts abruptly back to the original length. At this time, due to the abrupt contraction of the piezoelectric element 52b, the chuck 16 is supplied with an impulsive inertial force in the +X direction, and is moved in the +X direction. In other words, when the piezoelectric element 52b is supplied with a voltage pulse, which has a slow rise and a quick fall, the chuck 16 can be moved in the +X direction. Where such voltage pulses are applied to the piezoelectric element 52b in series, the chuck 16 can be continuously moved in the +X direction.

As described above, it is possible to efficiently move the chuck 16 in the −X direction or the +X direction, by adjusting the waveforms of voltage pulses applied to the piezoelectric element 52b of the actuator 41A. This driving method is also applied to the actuators 41B to 41D. The actuator 41B can be used to move the chuck 16 in the −X direction or the +X direction. The actuator 41C can be used to move the chuck 16 in a direction toward the actuator 41D from the actuator 41C (which will be referred to as "−Y direction", hereinafter), or in a direction toward the actuator 41C from the actuator 41D (which will be referred to as "+Y direction", hereinafter). The actuator 41D can be used to move the chuck 16 in the −Y direction or the +Y direction.

In the optical axis alignment apparatus 40, the actuators 41A and 41B are disposed to sandwich the chuck 16 in the X direction, and the actuators 41C and 41D are disposed to sandwich the chuck in the Y direction. Where the actuators 41A to 41D are driven by a voltage pulse, which has a quick rise and a slow fall, the actuator 41A can move the chuck 16 in the −X direction; the actuator 41B can move the chuck 16 in +X direction; the actuator 41C can move the chuck 16 in the −Y direction; and the actuator 41D can move the chuck 16 in the +Y direction, respectively.

Where the actuators 41A to 41D are driven by a voltage pulse, which has a slow rise and a quick fall, the actuator 41A can move the chuck 16 in the +X direction; the actuator 41B can move the chuck 16 in −X direction; the actuator 41C can move the chuck 16 in the +Y direction; and the actuator 41D can move the chuck 16 in the −Y direction, respectively. As described above, the position of the chuck 16 is moved along with the optical member 15 held by the chuck 16, so that optical axis alignment between the optical members 14 and 15 is performed.

Although the explanations have been given of the embodiments of the present invention, the present invention is not limited to these embodiments. For example, the number of optical members to be coupled is not limited to two or three, but may be more than three. In the optical axis alignment apparatus 30, the stage 17 may be disposed on a rotary stage 19, as in the optical axis alignment apparatus 10. In this case, welding between the optical members 14 and 35, and between the optical members 15 and 35 can be easily performed.

In the optical axis alignment apparatus 30, the stage 17 may be replaced with the slide stages 27 and 28, and the stationary stage 29 used in the optical axis alignment apparatus 20. In this case, the stationary stage 29 may be preferably held on a rotary stage. In such a structure, the actuators 33A and 33B are used to slide the slide stage 28, and the actuators 33C and 33D are used to slide the slide stage 27, instead of using the actuators 33A to 33D to strike the optical member 15.

INDUSTRIAL APPLICABILITY

As described, according to the present invention, optical axis alignment between optical members is performed, while the optical members are in face contact with each other and frictionally held. As a result, it is possible to perform the optical axis alignment in a shorter time with a higher accuracy and a smaller coupling loss, as compared to conventional cases where optical axis alignment is performed while separation and contact between optical members are repeated. Furthermore, since the optical members are brought into face contact with each other, using a simple mechanism, such as a universal joint, the structure of the apparatus can easily become simple and compact. Accordingly, it is possible to provide an inexpensive optical axis alignment apparatus. After the optical axis alignment is completed, the optical members are frictionally held to each other, and in this state, the optical members can be easily coupled by welding or the like.

What is claimed is:

1. An optical axis alignment apparatus using an impulsive inertial force generated by abrupt extension and contraction of a piezoelectric element, the apparatus comprising:

first holding means for holding a first optical member;

second holding means for holding a second optical member disposed in contact with the first optical member;

a pressing mechanism for pressing the first holding means to generate a predetermined frictional force between the first optical member and the second optical member; and an actuator, which has a piezoelectric element and uses an impulsive inertial force generated by abrupt extension and contraction of the piezoelectric element to strike a strike target, which is at least one of the first optical member, the second optical member, the first holding means, and the second holding means, so as to align optical axes of the first optical member and the second optical member with each other.

2. An optical axis alignment apparatus according to claim 1, wherein, the apparatus comprises a plurality of actuators such that, for each strike target, two actuators are disposed to sandwich the strike target in an X direction and a Y direction perpendicular to each other on one plane, respectively, so that the strike target is two-dimensionally moved by driving the actuators.

3. An optical axis alignment apparatus according to claim 1, wherein the actuator has the piezoelectric element, which generates an impulsive inertial force by abrupt extension and contraction, the piezoelectric element having one end fixed to the strike target in an extendable direction; and a weight disposed on the other end of the piezoelectric element in the extendable direction, wherein the piezoelectric element is extended and contracted to cause the weight to generate an impulsive inertial force, so as to move the strike target in a predetermined direction.

4. An optical axis alignment apparatus according to claim 1, wherein a third optical member is disposed stationary between the first optical member and the second optical member, and the actuator strikes the strike target to perform optical axis alignment among the first to third optical members.

5. An optical axis alignment apparatus according to claim 1, further comprising an X-Y stage having an X direction stage movable only in an X direction and a Y direction stage movable only in a Y direction, wherein the second holding means is fixed to the X-Y stage, the apparatus comprises a plurality of actuators such that two actuators are disposed to sandwich the strike target in the X direction and the Y direction, respectively, and the strike target is moved in only one of the X direction and the Y direction, by driving any one of the actuators.

6. An optical axis alignment apparatus according to claim 1, further comprising an X-Y stage having an X direction stage movable only in an X direction and a Y direction stage movable only in a Y direction, wherein the second holding means is fixed to the X-Y stage, the apparatus comprises a plurality of actuators such that two actuators are disposed to sandwich the strike target in the X direction and the Y direction, respectively, and the strike target is moved in only one of the X direction and the Y direction, by driving any one of the actuators.

7. An optical axis alignment apparatus according to claim 1, further comprising a rotary mechanism, which rotates the first optical member and the second optical member, wherein, after optical axis alignment between the first optical member and the second optical member is completed, a plurality of portions of the first optical member and the second optical member are welded by welding means for welding the first optical member and the second optical member, while the rotary mechanism is operated, so that the first optical member and the second optical member are entirely welded.

8. An optical axis alignment apparatus according to claim 1, wherein the actuator includes:

the piezoelectric element, which generates an impulsive inertial force by abrupt extension and contraction;

a tip member disposed in contact with the strike target to apply the impulsive inertial force to the strike target; and a pressing mechanism for pressing the tip member and the piezoelectric element to push the tip member against the strike target.

9. An optical axis alignment apparatus according to claim wherein the tip member is made of a stainless or super hard material.

10. An optical axis alignment apparatus according to claim 8, wherein a weight is disposed between the tip member and the piezoelectric element to increase an impulsive inertial force generated by abrupt extension and contraction of the piezoelectric element, so as to strike the strike target.

11. An optical axis alignment apparatus using an impulsive inertial force generated by abrupt extension and contraction of a piezoelectric element, the apparatus comprising:

first holding means for holding a first optical member;

a stage, on which the first holding means is placed;

second holding means for holding a second optical member disposed in contact with the first optical member;

a pressing mechanism for pressing the second holding means to generate a predetermined frictional force between the first optical member and the second optical member;

an tilting mechanism disposed between the second holding means and the pushing mechanism, or between the first holding means and the stage, and holding the first optical member and the second optical member in face contact with each other; and an actuator, which has a piezoelectric element and uses an impulsive inertial force generated by abrupt extension and contraction of the piezoelectric element to strike a strike target, which is at least one of the first optical member, the second optical member, the first holding means, and the second holding means, so as to align optical axes of the first optical member and the second optical member with each other.

12. An optical axis alignment apparatus according to claim 11, wherein the tilting mechanism is operated by thrust, which is generated when the first optical member and the second optical member are pushed against each other by a pressure applied by the pushing mechanism, whereby the first optical member and the second optical member are brought into face contact with each other.

13. An optical axis alignment apparatus according to claim 11, wherein the strike target is struck to operate the tilting mechanism, so as to bring the first optical member and the second optical member into face contact with each other and perform optical axis alignment.

14. An optical axis alignment apparatus according to claim 11, wherein the apparatus comprises a plurality of actuators such that, for each strike target, two actuators are disposed to sandwich the strike target in an X direction and a Y direction perpendicular to each other on one plane, respectively, so that the strike target is two-dimensionally moved by driving the actuators.

15. An optical axis alignment apparatus according to claim 11, further comprising an X-Y stage having an X direction stage movable only in an X direction and a Y direction stage movable only in a Y direction, wherein the stage is fixed to the X-Y stage, the apparatus comprises a plurality of actuators such that two actuators are disposed to sandwich the strike target in the X direction and the Y direction, respectively, and the strike target is moved in only one of the X direction and the Y direction, by driving any one of the actuators.

16. An optical axis alignment apparatus according to claim 11, further comprising an X-Y stage having an X direction stage movable only in an X direction and a Y direction stage movable only in a Y direction, wherein the stage is fixed to the X-Y stage, the apparatus comprises a plurality of actuators such that two actuators are disposed to sandwich the X direction stage in the X direction and two actuators disposed to sandwich the Y direction stage in the Y direction, and the strike target is moved in only one of the X direction and the Y direction, by driving any one of the actuators.

17. An optical axis alignment apparatus according to claim 11, further comprising a rotary mechanism, which rotates the first optical member and the second optical member, wherein, after optical axis alignment between the first optical member and the second optical member is completed, a plurality of portions of the first optical member and the second optical member are welded by the operation of the rotary mechanism using welding means for welding the first optical member and the second optical member, so that the first optical member and the second optical member are generally welded.

18. An optical axis alignment apparatus according to claim 11, wherein the actuator has the piezoelectric element, which generates an impulsive inertial force by abrupt extension and contraction;

a tip member disposed in contact with the strike target to apply the impulsive inertial force to the strike target; and a pressing mechanism for pressing the tip member and the piezoelectric element to push the tip member against the strike target.

19. An optical axis alignment apparatus according to claim 18, wherein the tip member is made of a stainless or super hard material.

20. An optical axis alignment apparatus according to claim 18, wherein a weight is disposed between the tip member and the piezoelectric element to increase an impulsive inertial force generated by abrupt extension and contraction of the piezoelectric element, so as to strike the strike target.

21. An optical axis alignment apparatus according to claim 11, wherein the actuator has the piezoelectric element, which generates an impulsive inertial force by abrupt extension and contraction, the piezoelectric element having one end fixed to the strike target in an extendable direction; and a weight disposed on the other end of the piezoelectric element in the extendable direction, wherein the piezoelectric element is extended and contracted to cause the weight to generate an impulsive inertial force, so as to move the strike target in a predetermined direction.

22. An optical axis alignment apparatus according to claim 11, wherein a third optical member is disposed between the first optical member and the second optical member, and the actuator strikes the strike target to perform optical axis alignment among the first to third optical members.

23. An optical axis alignment method of performing optical axis alignment between a plurality of optical members, the method comprising:

a first step of using an tilting mechanism to bring a plurality of optical members into face contact with each other, and applying a predetermined pressing force to the tilting mechanism to hold the plurality of optical members by friction; and a second step of striking at least one of the plurality of optical members, using an impulsive inertial force generated by abrupt extension and contraction of a piezoelectric element, to move the position of the struck optical member while keeping a state where the plurality of optical members are frictionally held, so as to increase light quantity passing through optical axes of the plurality of optical members, while measuring the light quantity passing through the optical axes of the plurality of optical members.

24. An optical axis alignment method according to claim 23, further comprising, after the second step, a third step of stopping striking the optical member when the light quantity passing through the optical axes of the plurality of optical members is at the maximum, and welding the plurality of optical members to each other to be united, while holding the plurality of optical member by friction.

* * * * *